(12) United States Patent
Mu et al.

(10) Patent No.: US 12,476,282 B2
(45) Date of Patent: Nov. 18, 2025

(54) BATTERY

(71) Applicant: ZHUHAI COSMX BATTERY CO., LTD., Zhuhai (CN)

(72) Inventors: Yingdi Mu, Zhuhai (CN); Ping Li, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

(21) Appl. No.: 19/176,395

(22) Filed: Apr. 11, 2025

(65) Prior Publication Data

US 2025/0329786 A1    Oct. 23, 2025

(30) Foreign Application Priority Data

Apr. 18, 2024  (CN) .......................... 202410470025.1

(51) Int. Cl.
*H01M 4/134* (2010.01)
*H01M 4/1395* (2010.01)
(Continued)

(52) U.S. Cl.
CPC ....... *H01M 10/0567* (2013.01); *H01M 4/364* (2013.01); *H01M 4/386* (2013.01);
(Continued)

(58) Field of Classification Search
None
See application file for complete search history.

(56) References Cited

U.S. PATENT DOCUMENTS

| | | | | |
|---|---|---|---|---|
| 2008/0233478 | A1* | 9/2008 | Hirose | H01M 4/0421 427/78 |
| 2009/0226821 | A1* | 9/2009 | Ihara | H01M 10/0569 429/336 |

(Continued)

FOREIGN PATENT DOCUMENTS

| | | | | |
|---|---|---|---|---|
| CN | 203932198 | * | 11/2014 | ............ H01M 4/13 |
| CN | 109473630 | * | 3/2019 | ............ H01M 4/139 |

(Continued)

OTHER PUBLICATIONS

English translation of CN 218385272 (Year: 2023).*
(Continued)

*Primary Examiner* — Yoshitoshi Takeuchi
(74) *Attorney, Agent, or Firm* — Westbridge IP LLC

(57) ABSTRACT

A battery includes a negative electrode plate and an electrolyte solution; the negative electrode plate includes a negative electrode active material layer, which includes a silicon-based material, and based on a total weight of the negative electrode active material layer, silicon content is A; a surface of the negative electrode active material layer has recesses; the electrolyte solution includes 1,3-propene sultone, a mass percentage of 1,3-propene sultone in a total mass of the electrolyte solution is E; and A, a depth of the recesses B, a width of the recesses C, a spacing of the recesses D, and E satisfy $0.05 \leq C/(A \times E \times B \times D) \leq 100$. The battery not only exhibits high energy density but also significantly mitigates the problem of damage and corner cracking of the outer film casing in the later stages of battery cycling.

20 Claims, 3 Drawing Sheets

(51) Int. Cl.
  *H01M 4/36* (2006.01)
  *H01M 4/38* (2006.01)
  *H01M 4/525* (2010.01)
  *H01M 4/583* (2010.01)
  *H01M 10/04* (2006.01)
  *H01M 10/0567* (2010.01)
  *H01M 50/122* (2021.01)
  *H01M 4/02* (2006.01)

(52) U.S. Cl.
  CPC ........... *H01M 4/525* (2013.01); *H01M 4/583* (2013.01); *H01M 10/0431* (2013.01); *H01M 50/122* (2021.01); *H01M 2004/021* (2013.01); *H01M 2004/027* (2013.01); *H01M 2004/028* (2013.01)

(56) References Cited

U.S. PATENT DOCUMENTS

2011/0192623 A1* 8/2011 Fujinaga ............... H01M 4/366
  173/217
2012/0040242 A1* 2/2012 Kurasawa ............. H01M 4/134
  429/211
2022/0158177 A1* 5/2022 Chen ....................... H01M 4/64

FOREIGN PATENT DOCUMENTS

| CN | 111430723 | * | 7/2020 | ............. H01M 4/66 |
| CN | 113782725 | * | 8/2022 | ............. H01M 4/36 |
| CN | 218385272 U | * | 1/2023 | ............. H01M 4/13 |
| CN | 117239055 A | | 12/2023 | |
| CN | 117374216 A | | 1/2024 | |
| CN | 117727874 A | | 3/2024 | |
| CN | 117832591 A | | 4/2024 | |

OTHER PUBLICATIONS

English translation of CN 113782725 (Year: 2021).*
English translation of CN 111430723 (Year: 2020).*
English translation of CN 109473630 (Year: 2019).*
English translation of CN 203932198 (Year: 2014).*

* cited by examiner

BATTERY

CROSS-REFERENCE TO RELATED APPLICATIONS

The present disclosure claims priority to Chinese Patent Application No. 202410470025.1, filed on Apr. 18, 2024, which is hereby incorporated by reference in its entirety.

TECHNICAL FIELD

The present disclosure relates to the field of batteries, specifically to a battery.

BACKGROUND

In recent years, lithium-ion batteries have been widely used in fields such as digital products, energy storage, power, military aerospace, and communication devices. With the diversification of electronic devices and the development of their functions, people's requirements for the battery life of electronic devices are also getting higher and higher. Therefore, improving the energy density of lithium-ion batteries is a current research hotspot. Using silicon-containing materials as the negative electrode active materials is one of the effective means to improve the energy density of the lithium-ion batteries. However, as the silicon content in the negative electrode active materials increases, the problem of damage and corner cracking of the outer film casing in the later stages of battery cycling becomes more and more serious, which directly affects the cycle life of the batteries.

Therefore, it is of great significance to improve the energy density of lithium-ion batteries while solving the problem of damage and corner cracking of the outer film casing in the later stage of battery cycling.

SUMMARY

The present disclosure provides a battery to overcome the problem in the prior art in which silicon-doped batteries with high energy density are prone to damage and corner cracking of the outer film casing in the later stages of battery cycling. The battery of the present disclosure not only exhibits high energy density but also significantly mitigates the problem of damage and corner cracking of the outer film casing in the later stages of battery cycling.

The present disclosure provides a battery including a negative electrode plate and an electrolyte solution. The negative electrode plate includes a negative electrode current collector and a negative electrode active material layer disposed on at least one surface of the negative electrode current collector. The negative electrode active material layer includes a negative electrode active material, the negative electrode active material includes a silicon-based material. Based on a total weight of the negative electrode active material layer, a content of silicon is A (unit: %). A surface of the negative electrode active material layer has recesses with a depth of B (unit: μm), a width of C (unit: μm), and a spacing of D (unit: mm). The electrolyte solution includes 1,3-propene sultone, and a mass percentage of 1,3-propene sultone in a total mass of the electrolyte solution is E (unit: %). The relationship $0.05 \leq C/(A \times E \times B \times D) \leq 100$ is satisfied.

Through the above technical solution, the present disclosure offers the following advantages compared with the prior art.

Firstly, the battery of the present disclosure exhibits high energy density while mitigating the problem of damage and corner cracking of the outer film casing in the later stages of battery cycling, and has excellent sealing performance after cycling.

Secondly. the battery of the present disclosure exhibits superior cycle performance, high-temperature and high-humidity storage performance, and low-temperature discharge performance.

The endpoints and any values disclosed in the ranges herein are not limited to the precise ranges or values and should be interpreted to include values approximating these ranges or values. For numerical ranges, the endpoints of the ranges, the endpoints and individual point values, and individual point values may be combined to form one or more new numerical ranges, which should be considered as specifically disclosed herein.

DETAILED DESCRIPTIONS OF THE EMBODIMENTS

The following provides a detailed explanation of specific embodiments of the present disclosure. It should be understood that the specific embodiments described herein are intended to illustrate and explain the disclosure and not to limit it.

Conventional silicon-containing batteries often suffer from the problem of damage and corner cracking of the outer film casing in the later stages of battery cycling. Through extensive experimentation, the inventors of the present disclosure have found that the possible causes of the above-mentioned problems are as follows.

Firstly, as the silicon-containing batteries undergo charge/discharge cycles, the volume expansion of silicon becomes larger and larger, eventually breaking the outer film casing.

Secondly, during the process of lithium deintercalation/intercalation in the negative electrode plate, the probability of side reactions between the negative electrode plate and the electrolyte solution increases, leading to increased gas generation and subsequent rupture of the outer film casing.

Lastly, on one hand, the volume expansion of silicon exerts a certain degree of pressure on the negative electrode current collector. On the other hand, the corrosion of the negative electrode current collector by the electrolyte solution damages its crystal structure, making it thinner and more prone to stretching. Both factors cause the negative electrode current collector to be extended, which punctures the outer film casing.

Based on the above three reasons, the inventors conducted a large number of targeted studies and discovered that modifying either the electrolyte solution or the structure of the negative electrode plate may partially mitigate the above-mentioned problems. This is because the electrolyte solution, as an important component of the battery, facilitates the transport of $Li^+$, and the additives in it form a protective film on the negative electrode plate, which may inhibit the volume expansion of the negative electrode plate and protect the negative electrode plate. Similarly, as an important component of the battery, structural modifications to the negative electrode plate may mitigate its expansion.

Based on this, the inventors of the present disclosure propose the following solution.

Figure 1:
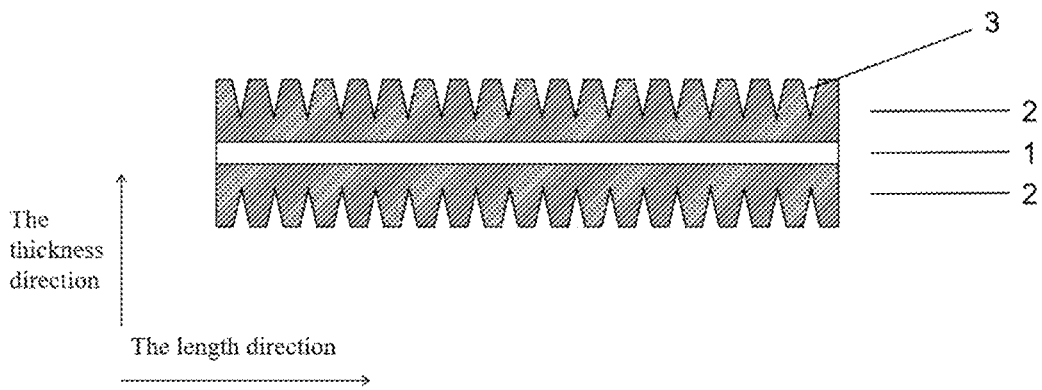
FIG. 1 is a cross-sectional schematic diagram of a negative electrode plate according to an embodiment of the present disclosure.
Figure 2:
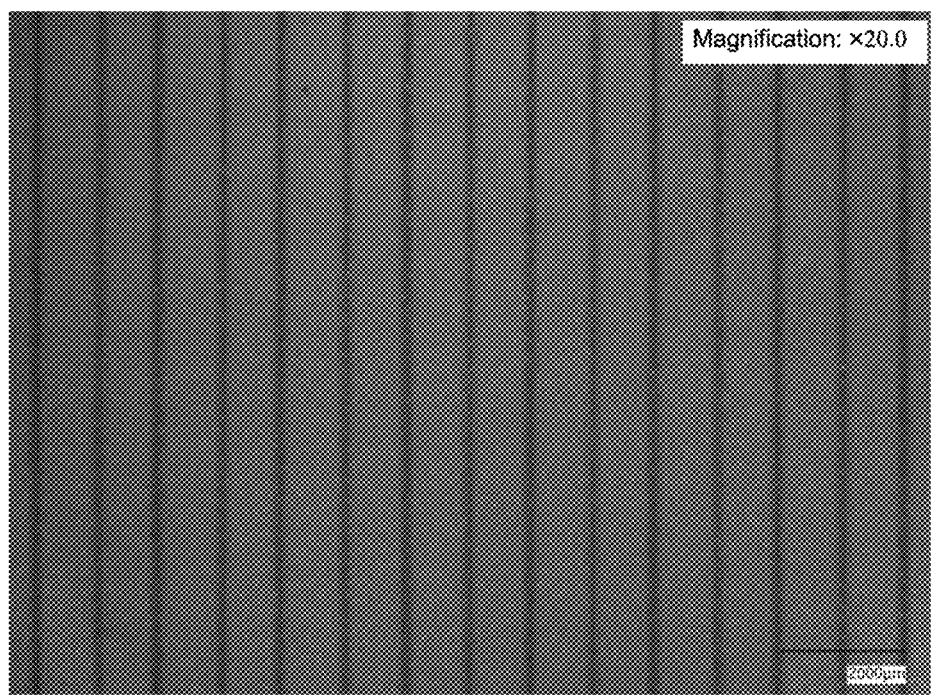
FIG. 2 is a scanning electron microscope (SEM) image of a negative electrode plate according to an embodiment of the present disclosure.

The present disclosure provides a battery. The battery may include a negative electrode plate and an electrolyte solution. The negative electrode plate may include a negative electrode current collector and a negative electrode active material layer disposed on at least one surface of the negative electrode current collector. The negative electrode active material layer may include a negative electrode active material, and the negative electrode active material may include a silicon-based material. Based on a total weight of the negative electrode active material layer, a content of silicon is A (unit: %). A surface of the negative electrode active material layer may have recesses. FIG. 1 shows a cross-sectional schematic diagram of a negative electrode plate according to one embodiment of the present disclosure. As shown, the negative electrode plate includes a negative electrode current collector 1 and negative electrode active material layers 2 disposed on both surfaces of the negative electrode current collector 1, and the surfaces of the negative electrode active material layers 2 include recesses 3. FIG. 2 shows a scanning electron microscope (SEM) image of a negative electrode plate according to one embodiment, illustrating the recesses on the surface of the negative electrode active material layer.

A depth of the recesses may be B (unit: μm), a width of the recesses may be C (unit: μm), and a spacing of the recesses may be D (unit: mm). The electrolyte solution may include 1,3-propene sultone (PST), and a mass percentage of 1,3-propene sultone in a total mass of the electrolyte solution is E (unit: %). A, B, C, D, and E satisfy: $0.05 \leq C/(A \times E \times B \times D) \leq 100$, for example, is 0.05, 0.1, 0.5, 1, 5, 10, 15, 20, 25, 30, 35, 40, 45, 50, 55, 60, 65, 70, 75, 80, 85, 90, 95, or 100.

The recesses on the negative electrode plate surface enhance electrolyte solution wettability into the negative electrode active material layer, thereby improving capacity utilization and energy density. Moreover, the recesses provide buffer space for volume expansion of the silicon-based material. PST in the electrolyte solution forms a stable protective film on the negative electrode. This protective film may not only inhibit the volume expansion of the silicon-based material to a certain extent but also protect the negative electrode plate. This protection is reflected in two aspects: on one hand, it may reduce the probability of side reactions between the electrolyte solution and the negative electrode active material; on the other hand, it may reduce the corrosion of the negative electrode current collector by the electrolyte solution, thereby reducing the dissolution of metal ions (such as copper ions) from the negative electrode current collector and inhibiting the extension of the negative electrode current collector during the battery cycling process. However, using a negative electrode plate with recesses or a PST-containing electrolyte solution alone proves insufficient to effectively prevent damage and corner cracking of the outer film casing in the later stages of battery cycling. Combining a negative electrode plate with recesses and a PST-containing electrolyte solution may further mitigate the problem of damage and corner cracking of the outer film casing in the later stages of battery cycling compared to using either of them alone. This may be because PST may avoid the localized wetting of the electrode solution on the negative electrode plate caused by the recesses, ensuring uniform distribution of the electrolyte solution within the negative electrode plate, improving overall wettability of the electrode solution on the negative electrode plate, promoting the formation of a highly homogeneous phase inside the negative electrode plate, and enhancing the structural stability of the negative electrode plate. Nevertheless, the improvement effect is still not significant, and reasons may be as follows: First, there exists an interdependent constraint between the negative electrode plate and the electrolyte solution. Specifically, as a internal surface area of the recesses on the negative electrode plate increases, the wettability of the electrolyte solution into the negative electrode active material layer improves. However, this also increases the probability of side reactions between the electrolyte solution and the negative electrode active material layer, as well as corrosion of the negative electrode current collector by the electrolyte solution. To mitigate these issues, a higher PST content in the electrolyte solution is required to provide stronger binding effects. But, excessive PST leads to increased battery impedance and cause lithium plating, significantly deteriorating the battery cycling performance. Second, the negative electrode plate and the electrolyte solution have a certain restrictive relationship with the silicon content respectively. In order to improve the energy density of the battery, it is necessary to increase the silicon content in the negative electrode active material layer. When the silicon content increases, the volume expansion of the negative electrode plate will also increase. On one hand, it is necessary to increase the volume of the recesses to provide more buffer space to relieve the volume expansion of the negative electrode plate; on the other hand, it is necessary to add more PST to form a stronger protective film to inhibit the volume expansion of the silicon-based material and protect the negative electrode plate from being damaged by the electrolyte solution. Therefore, it is necessary to regulate the relationship among: the silicon content A in the negative electrode active material layer, the dimensions of the recesses (a depth B, a width C, and a spacing D), and a content of 1,3-propene sultone E in the electrolyte solution to achieve optimal compatibility among these three parameters. In this way, on the basis of improving the energy density of the battery, the problem of damage and corner cracking of the outer film casing in the later stages of battery cycling may be effectively improved. When $C/(A \times E \times B \times D)$ is too small (for example, less than 0.05), the liquid-storage capacity of the negative electrode plate is large, which will make the negative electrode plate soften and the separator warp, resulting in bridge-breaking lithium plating and seriously affecting the electrical performance of the battery. When $C/(A \times E \times B \times D)$ is too large (for example, greater than 100), the electrolyte solution cannot wet the negative electrode plate enough, and the inhibition of side reactions is not sufficient, so that the performance of protecting the negative electrode plate cannot be optimized.

In an embodiment, $0.1 \leq C/(A \times E \times B \times D) \leq 45$.

In an embodiment, $0.15 \leq C/(A \times E \times B \times D) \leq 17$.

In the present disclosure, the calculation of "$C/(A \times E \times B \times D)$" uses only the numerical values of A, B, C, D, and E, without including their units in the computation. For example, in Example 1, $C/(A \times E \times B \times D) = 80/(5 \times 0.2 \times 10 \times 0.8) = 10$.

In the present disclosure, the silicon content in the negative electrode active material layer (A) refers to the content of silicon element in the negative electrode active material layer, which can be determined using conventional methods in the art, such as thermogravimetric analysis (TGA). The specific procedure is as follows: The battery was discharged to 0% state of charge (SOC), then disassembled to extract the negative electrode plate. The negative electrode plate was heat-treated at 400° C. for 2 hours under a nitrogen atmosphere to separate the negative electrode active material layer from the negative electrode current collector. The negative electrode active material layer was then collected as the test sample. Using a thermogravimetric analyzer (such as a TGA550), a sample weighing 5 mg to 15 mg was analyzed under an air or oxygen atmosphere. The temperature was increased from room temperature (25° C.) to 900° C. at a heating rate of 10° C./min, followed by a 40-minute isothermal hold at 900° C. This enabled the non-silicon components in the negative electrode active material layer to volatilize while ensuring that silicon was fully oxidized to silicon dioxide. Based on the weight percentage at the end of the entire testing process, by dividing by the molar mass of silicon dioxide and then multiplying by the molar mass of silicon, the silicon content in the negative electrode active material layer A (in unit of %) was obtained.

In the present disclosure, the depth of the recesses refers to the maximum vertical distance from any point within a recess to the surface of the negative electrode active material layer. The depth can be measured using conventional techniques, such as 3D microscope.

In the present disclosure, the recesses may include a concave hole or a groove.

In one embodiment, the recesses includes the grooves.

In one embodiment, the recesses is the grooves.

Figure 3A:
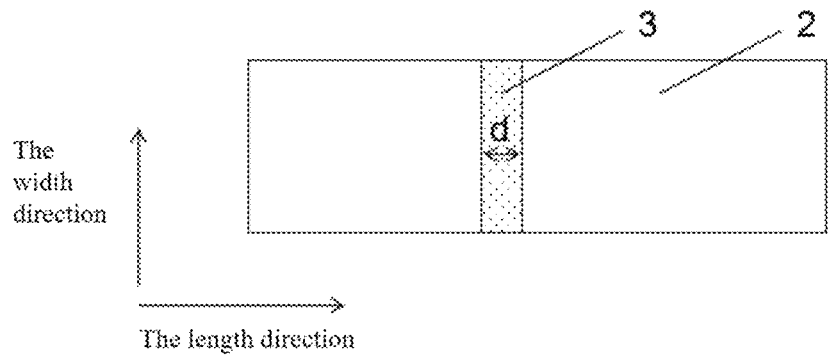
FIG. 3a is a schematic diagram of a width of a groove according to an embodiment of the present disclosure.
Figure 3B:
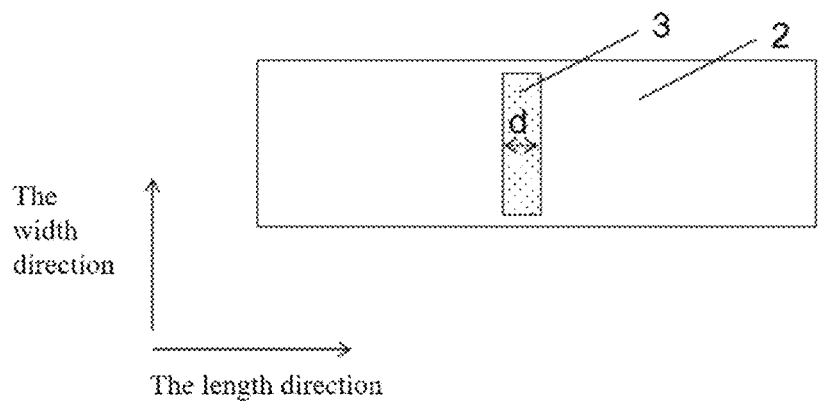
FIG. 3b is a schematic diagram of a width of a groove according to an embodiment of the present disclosure.
Figure 3C:
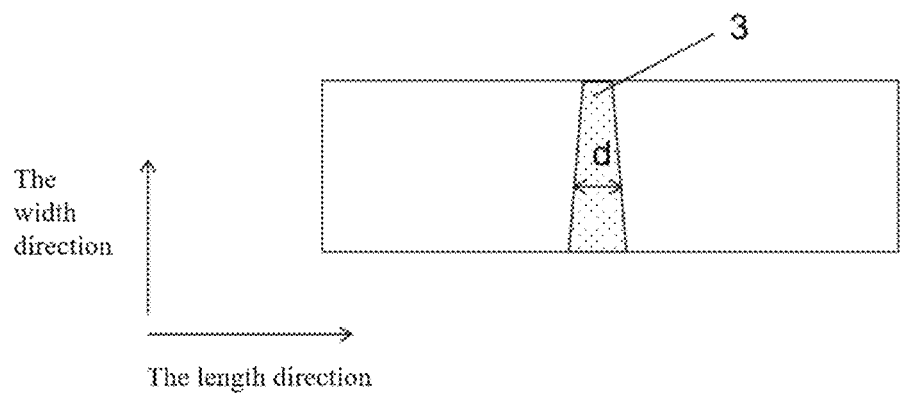
FIG. 3c is a schematic diagram of a width of a groove according to an embodiment of the present disclosure.
Figure 3D:
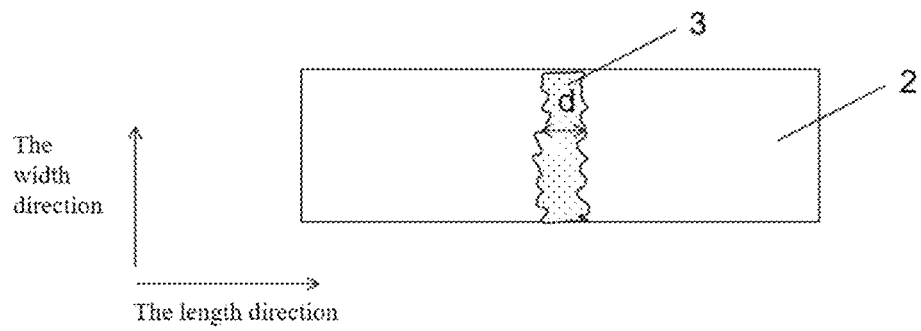
FIG. 3d is a schematic diagram of a width of a groove according to an embodiment of the present disclosure.

In the present disclosure, the orthographic projection of the groove on the negative electrode active material layer can include two long edges. The width of the groove refers to the average distance between one long edge and the other long edge along either the length direction or the width direction of the negative electrode active material layer. FIGS. 3a-3d illustrate schematic diagrams of a width of a groove according to one embodiment of the present disclosure, the two long edges of the grooves in FIGS. 3a-3c are straight lines, and the two long edges of the groove in FIG. 3d are curved lines. In FIGS. 3a and 3b, the two long edges are arranged parallel to each other. Therefore, in the length direction of the negative electrode plate, the distance from any point on one long edge to the other long edge is equal. In this case, the width of the groove is the distance (d) from any point on one long edge to the other long edge in the length or width direction of the negative electrode plate. In FIG. 3c, the two long edges of the groove are straight lines but not arranged in parallel. Therefore, the distance from any point on one long edge to the other long edge is not equal. In this case, the width of the groove can be obtained by taking the average value. That is, 50 points are selected at equal intervals based on the length of one long edge (the distance between each point is equal, equal spacing ensures calculation accuracy), the width (d) at each point is measured, and the average value is taken to obtain the width of the groove. In FIG. 3d, the two long edges are curved lines. Therefore, the distance from any point on one long edge to the other long edge may not equal. In this case, the width of the groove can also be obtained by taking the average value. That is, 50 points are randomly selected on one long edge (since the two long edges in FIG. 3d are curved lines and there is no relationship like that of the two long edges in FIG. 3c, 50 points can be randomly selected for measurement), the width (d) at each point is measured, and the average value is taken to obtain the width of the groove. The width of the groove can be measured by conventional means in the art, such as by SEM or a 3D microscope.

Figure 4A:
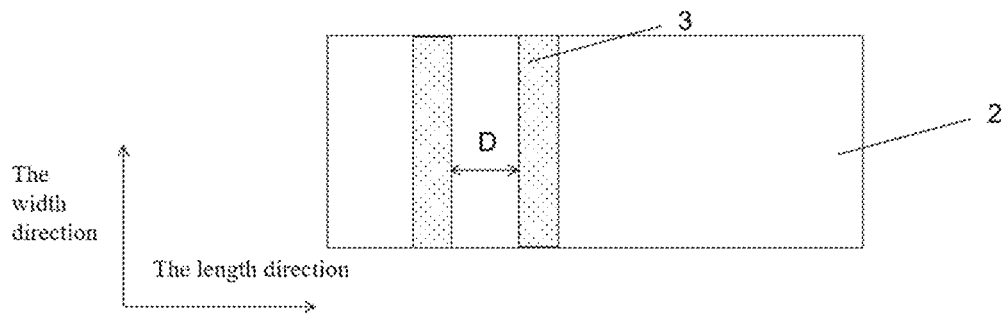
FIG. 4a is a schematic diagram of a spacing of two grooves according to an embodiment of the present disclosure.
Figure 4B:
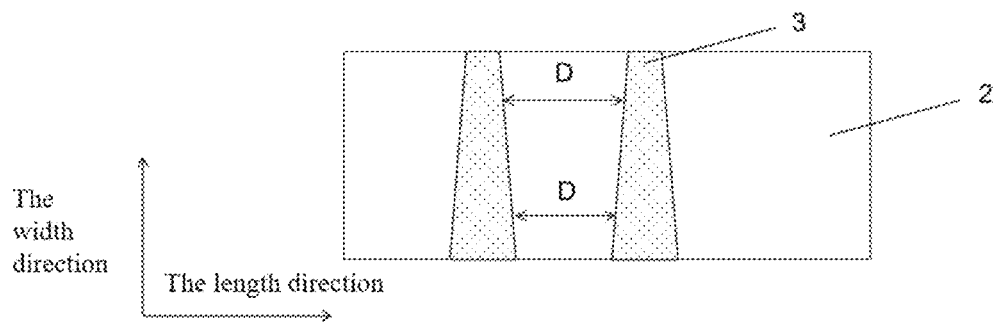
FIG. 4b is a schematic diagram of a spacing of two grooves according to an embodiment of the present disclosure.
Figure 4C:
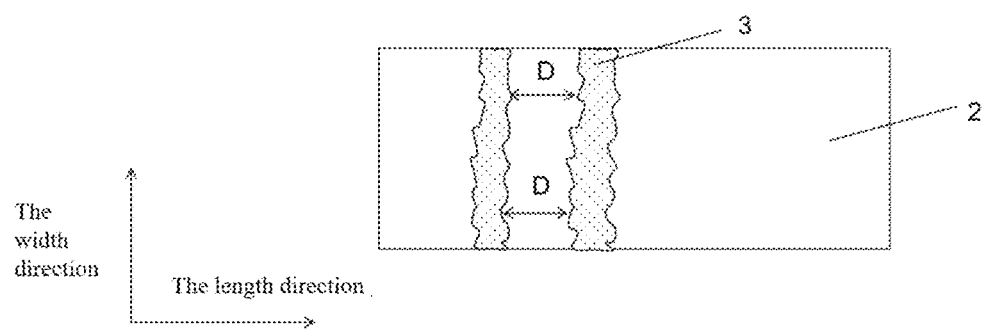
FIG. 4c is a schematic diagram of a spacing of two grooves according to an embodiment of the present disclosure.

In the present disclosure, the spacing of the grooves refers to the average distance between the adjacent two long edges of two adjacent grooves on the negative electrode active material layer in the length or width direction of the negative electrode plate. As illustrated in FIGS. 4a-4c showing schematic diagrams of a spacing of two grooves according to one embodiment: FIG. 4a shows the case where the adjacent two long edges are straight lines and parallel, FIG. 4b shows the case where the adjacent two long edges are straight lines but not parallel, and FIG. 4c shows the case where the adjacent two long edges are curved lines. In FIG. 4a, the adjacent two long edges are straight lines and arranged in parallel. Therefore, in the length direction, the distance from any point on one long edge to the other long edge is equal. In this case, the spacing of the grooves is the distance (D) from any point on one long edge to the other long edge in the length direction. In FIG. 4b, the adjacent two long edges are straight lines but not arranged in parallel. Therefore, the distance from any point on one long edge to the other long edge is not equal. In this case, the spacing of the grooves can be obtained by taking the average value. That is, 50 points are selected at equal intervals based on the length of one long edge (the distance between each point is equal, equal spacing ensures calculation accuracy), the width (D) at each point is measured, and the average value is taken to obtain the spacing of the grooves. In FIG. 4c, the adjacent two long edges are curved lines. Therefore, the distance from any point on one long edge to the other long edge may not equal. In this case, the spacing of the grooves can also be obtained by taking the average value. That is, 50 points are randomly selected on one long edge (since the two long edges in FIG. 4c are curved lines and there is no relationship like that of the two long edges in FIG. 4b, 50 points can be randomly selected for measurement), the width (D) at each point is measured, and the average value is taken to obtain the spacing of the grooves. The spacing of the grooves can be measured by conventional means in the art, such as by SEM or a 3D microscope.

In the present disclosure, there are no particular limitations on the manufacturing methods for the grooves, provided that the objectives of the present disclosure can be achieved. For example, the groove manufacturing methods may include at least one of laser etching processing, mechanical machining, or pore-forming agent processing.

In one embodiment, the groove manufacturing method includes laser etching processing.

The width and depth of the grooves increase with higher laser power, while different spacings of the grooves can be achieved by adjusting either the laser processing rate or the feeding speed of the negative electrode plate. Therefore, the width, depth, and spacing of the grooves can be precisely controlled by regulating the laser power, processing rate, and feeding speed of the negative electrode plate.

In the present disclosure, the shape of the grooves is not particularly limited. The cross-sectional shape of the grooves along the thickness direction of the negative electrode plate may be rectangular or quasi-conical.

In the present disclosure, the mass percentage of 1,3-propene sultone in the total mass of the electrolyte solution (E) can be determined using conventional analytical methods in the art, such as gas chromatography-mass spectrometry (GC-MS).

In the present disclosure, the silicon-based material includes at least one of nano-silicon, silicon alloy, silicon oxide($SiO_x$, $0<x<2$), or silicon carbon. The silicon carbon refers to a composite material including silicon element and carbon element.

In the present disclosure, the silicon-based material includes the silicon carbon.

In the present disclosure, the silicon carbon includes the following material: silicon particles embedded in a porous carbon framework.

In the present disclosure, the negative electrode active material may further include a carbon-based material. The carbon-based material may include at least one of artificial graphite, natural graphite, mesocarbon microbead, soft carbon, or hard carbon.

In one embodiment, the negative electrode active material includes the silicon-based material and the artificial graphite.

The inventors of the present disclosure have discovered that, when C/(A×E×B×D) falls within a specified range and when parameters B, C, and D are maintained within their respective defined ranges, the following synergistic effects are achieved: on the one hand, significantly improved localized electrolyte solution infiltration into the negative electrode active material layer, which enhances overall electrolyte solution wettability across the entire negative electrode plate, promotes uniform distribution of the electrolyte solution within the negative electrode plate, and facilitates formation of a highly homogeneous phase within the negative electrode plate, thereby further optimizing battery capacity utilization. On the other hand, effective mitigation of volume expansion in the negative electrode plate. Specifically, when the depth of the recesses B is maintained within its designated range, it not only improves the wettability of the electrolyte solution to accelerate lithium-ion intercalation/deintercalation kinetics and enhance the dynamic performance of the negative electrode plate, but also increases utilization efficiency of the negative electrode active material, consequently increasing energy density of the batteries. Furthermore, when the width C and spacing D of the recesses are properly controlled within specific ranges, they will not affect the adhesion performance between the negative electrode plate and the separator. If the width is too large and the spacing is too small, the adhesion force at this position with the separator is relatively weak and induce lithium plating. If the width is too small and the spacing is too large, it may fail to provide adequate electrolyte solution absorption and lithium-ion accommodation capacity, similarly leading to lithium plating risks.

In the present disclosure, B can range from 5 μm to 50 μm, for example, is 5 μm, 10 μm, 15 μm, 20 μm, 25 μm, 30 μm, 35 μm, 40 μm, 45 μm, or 50 μm. C can range from 40 μm to 200 μm, for example, is 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm. D can range from 0.5 mm to 5 mm, for example, is 0.5 mm, 1 mm, 2 mm, 3 mm, 4 mm, or 5 mm.

In one embodiment, B ranges from 10 μm to 30 μm.
In one embodiment, C ranges from 80 μm to 150 μm.
In one embodiment, D ranges from 0.8 mm to 2 mm.

Under the premise that C/(A×E×B×D) falls within a specific range, when A is within a defined range, the energy density of the battery can be improved.

In the present disclosure, A can range from 0.8% to 25%, for example, is 0.8%, 1%, 1.5%, 2%, 3%, 4%, 5%, 6%, 7%, 8%, 9%, 10%, 20%, or 25%.

In one embodiment, A ranges from 1.2% to 20%.
In one embodiment, A ranges from 3% to 15%.

Under the premise that C/(A×E×B×D) falls within a specific range, when E is within a defined range, the probability of side reactions between the electrolyte solution and the negative electrode active material can be reduced without significantly adversely affecting the impedance of the battery, while also mitigating the corrosive effect of the electrolyte solution on the negative electrode current collector. This prevents fractures in the electrode plate (particularly in the bending region of the jelly roll) caused by corrosion, and mitigates stress concentration in the negative electrode plate, thereby further enhancing the protection of the negative electrode plate.

In the present disclosure, E can range from 0.1% to 5%, for example, is 0.1%, 0.2%, 0.3%, 0.4%, 0.5%0.6%, 0.7%, 0.8%, 0.9%1, %, 1.5%, 2%, 2.5%, 3%, 3.5%, 4%, 4.5%, or 5%.

In one embodiment, E ranges from 0.2% to 3%.

1,3-propane sultone (PS) can synergistically enhance the strength of the protective film formed by 1,3-propene sultone. The combined use of these compounds further improves the suppression of volume expansion in silicon-based materials and enhances the protection of the negative electrode plate.

In the present disclosure, the electrolyte solution may further include 1,3-propane sultone. A mass percentage of 1,3-propane sultone in total mass of the electrolyte solution is F (unit: %), where 0.5%≤F≤6%, for example, is 0.5%, 1%, 1.5%, 2%, 2.5%, 3%, 3.5%, 4%, 4.5%, 5%, 5.5%, or 6%.

In one embodiment, 1%≤F≤4%.

In the present disclosure, the mass percentage of 1,3-propane sultone in total mass of the electrolyte solution F can be determined by conventional methods in the art, such as gas chromatography-mass spectrometry (GC-MS).

When E/F falls within a specific range, the synergistic effect between the two compounds can be exerted at a relatively optimal level. Under such conditions, the polymer monomers formed after the ring-opening polymerization of PS and PST have longer and more stable chains, which can form a more resilient and stronger protective film. This effectively suppresses side reactions and mitigates electrolyte solution corrosion on the negative electrode current collector, thereby inhibiting corner cracking of the outer film casing in later stages of battery cycles. Additionally, it enhances the sealing performance of the battery after cycling, preventing moisture ingress and improving cycle stability as well as storage performance under high-temperature and high-humidity conditions of the battery.

If E/F is too small (such as less than 0.02), the synergistic effect cannot be fully utilized. Conversely, if E/F is too large (such as greater than 6), the resulting protective film exhibits excessively high impedance, degrading the low-temperature performance of the battery.

In the present disclosure, 0.02≤E/F≤6, for example, is 0.02, 0.05, 0.1, 0.2, 0.3, 0.4, 0.5, 0.6, 0.7, 0.8, 0.9, 1, 2, 3, 4, 5, or 6.

In one embodiment, 0.05≤E/F≤3.

The inventors of the present disclosure have discovered that, when the elongation rate of the negative electrode plate falls within a specific range after the battery undergoes 1000 cycles at 25° C., it can further mitigate the problem of damage and corner cracking of the outer film in the later stages of battery cycling.

In the present disclosure, a elongation rate of the negative electrode plate after 1000 cycles at 25° C. can range from 2% to 5%, for example, is 2%, 2.5%, 3%, 3.5%, 4%, 4.5%, or 5%. And a cycling condition includes: the battery was charged to an upper limit voltage at a constant current of 1.5 C, where a cut-off current was 0.05 C, the battery was left aside for 5 minutes after being fully charged, and then discharge to a cut-off voltage of 3.0 V at a constant current of 0.7 C, and the upper limit voltage is 4.5 V.

In one embodiment, the elongation rate of the negative electrode plate after 1000 cycles at 25° C. ranges from 2% to 4%.

In the present disclosure, the elongation rate of the negative electrode plate can be measured by conventional methods in the art, specifically as follows: The battery is disassembled, followed by took the negative electrode plate out, which is subsequently sectioned into strips with a length of 60 mm+5 mm and a width of 15 mm+0.25 mm. Then, a universal mechanical testing machine is used to perform a tensile test with a gauge length of 30 mm and a speed of 30 mm/min.

In the present disclosure, the negative electrode current collector may include a copper foil.

In the present disclosure, the negative electrode active material layer can further include a negative electrode conductive agent and a negative electrode binder. The negative electrode conductive agent can include at least one selected from the group consisting of conductive carbon black, acetylene black, ketjen black, conductive graphite, carbon nanotube (including at least one of single-walled carbon nanotube and multi-walled carbon nanotube), and carbon fiber. The negative electrode binder can include at least one selected from the group consisting of polyvinylidene fluoride (PVDF), sodium carboxymethyl cellulose, styrene-butadiene rubber, polytetrafluoroethylene, and polyoxyethylene.

In the present disclosure, based on a total weight of the negative electrode active material layer: a content of the negative electrode active material can range from 80% to 99.8% (for example, is 80%, 82%, 84%, 86%, 88%, 90%, 92%, 94%, 96%, 98%, 99%, or 99.8%); a content of the negative electrode conductive agent can range from 0.1% to 10%, (for example, is 10%, 9%, 8%, 7%, 6%, 5%, 4%, 3%, 2%, 1%, 0.5%, or 0.1%); a content of the negative electrode binder can range from 0.1% to 10% (for example, is 10%, 9%, 8%, 7%, 6%, 5%, 4%, 3%, 2%, 1%, 0.5%, or 0.1%).

In the present disclosure, the electrolyte solution can further include at least one selected from the group consisting of a nitrile compound, a sulfur-containing compound, and a carbonate compound. The nitrile compound may include at least one selected from the group consisting of succinonitrile, glutaronitrile, adiponitrile, pimelonitrile, suberonitrile, glycerin trinitrile, ethoxy(pentafluoro)phosphazene, 1,2,3,4,5-penta(2-cyanoethoxy)pentane, tris(2-cyanoethyl) phosphate, and 1,3,6-hexanetricarbonitrile. The sulfur-containing compound may include at least one selected from the group consisting of ethylene sulfate and ethylene sulfite. The carbonate compound may include at least one selected from the group consisting of ethylene carbonate, fluoroethylene carbonate, and vinylethylene carbonate.

The nitrile compound is capable of forming complexes through coordination on the surface of the positive electrode plate, thereby providing protection to the positive electrode plate. The carbonate compound can be reduced on the surface of the negative electrode to form a protective film. The sulfur-containing compound can enhance the protective effects on both the positive electrode plate and the negative electrode plate.

In the present disclosure, the electrolyte solution can further include an organic solvent. The organic solvent can include at least one selected from the group consisting of a carbonate ester, a carboxylic acid ester, and a fluoro-ether. The carbonate ester may include at least one selected from the group consisting of ethylene carbonate (EC), propylene carbonate (PC), dimethyl carbonate, ethyl methyl carbonate, diethyl carbonate, and methyl propyl carbonate. The carboxylic acid ester may include at least one selected from the group consisting of ethyl propionate (EP) and propyl propionate (PP). The fluoro-ether may include 1,1,2,3-tetrafluoroethyl-2,2,3,3-tetrafluoropropyl ether.

In the present disclosure, the electrolyte solution can further include a lithium salt. The lithium salt may include at least one selected from the group consisting of lithium bis(trifluoromethanesulphonyl)imide, lithium bis(fluorosulfonyl)imide, and lithium hexafluorophosphate ($LiPF_6$). In the electrolyte solution, a mass percentage of the lithium salt ranges from 10% to 20%, for example, is 10%, 11%, 12%, 13%, 14%, 15%, 16%, 17%, 18%, 19%, or 20%.

In the present disclosure, the battery may further include a positive electrode plate. The positive electrode plate may include a positive electrode current collector and a positive electrode active material layer disposed on at least one surface of the positive electrode current collector, and the positive electrode active material layer includes a positive electrode active material.

In one embodiment, the positive electrode active material includes a lithium cobalt oxide and/or a lithium cobalt oxide that is doped and/or coated with at least two elements selected from the group consisting of Al, Mg, Mn, Cr, Ti, Zr, Y, La, and B.

In one embodiment, the positive electrode active material includes a material represented by a formula of $Li_aCo_bM^1_{c1}M^2_{c2}M^3_{c3}M^4_{c4}O_2$, where 0.9≤a≤1.05 (for example, is 0.9, 0.91, 0.92, 0.93, 0.94, 0.95, 0.96, 0.97, 0.98, 0.99, 1, 1.01, 1.02, 1.03, 1.04, or 1.05), 0.8≤b≤1.2 (for example, is 0.8, 0.9, 1, 1.1, or 1.2), 0≤c1≤0.1 (for example, is 0, 0.01, 0.02, 0.03, 0.04, 0.05, 0.06, 0.07, 0.08, 0.09, or 0.1), 0≤c2≤0.1 (for example, is 0, 0.01, 0.02, 0.03, 0.04, 0.05, 0.06, 0.07, 0.08, 0.09, or 0.1), 0≤c3≤0.1 (for example, is 0, 0.01, 0.02, 0.03, 0.04, 0.05, 0.06, 0.07, 0.08, 0.09, or 0.1), 0≤c4≤0.1 (for example, is 0, 0.01, 0.02, 0.03, 0.04, 0.05, 0.06, 0.07, 0.08, 0.09, or 0.1), and $M^1$, $M^2$, $M^3$ and $M^4$ each independently include at least one of Al, Mg, Mn, Cr, Ti, Zr, Y, La, or B.

In one embodiment, 0.01≤c1≤0.1.

In one embodiment, 0.005≤c2≤0.1.

In one embodiment, 0.01≤c2≤0.1.

In the present disclosure, the positive electrode active material layer can further include a positive electrode conductive agent and a positive electrode binder. The positive electrode conductive agent may include at least one selected from the group consisting of conductive carbon black, acetylene black, ketjen black, conductive graphite, carbon nanotube (including at least one of single-walled carbon nanotube and multi-walled carbon nanotube), and carbon fiber. The positive electrode binder may include at least one selected from the group consisting of polyvinylidene fluoride (PVDF), sodium carboxymethyl cellulose, styrene-butadiene rubber, polytetrafluoroethylene, and polyoxyethylene.

In the present disclosure, based on a total weight of the positive electrode active material layer: a content of the positive electrode active material can range from 80% to 99.8% (for example, is 80%, 82%, 84%, 86%, 88%, 90%, 92%, 94%, 96%, 98%, 99%, or 99.8%); a content of the positive electrode conductive agent can range from 0.1% to 10% (for example, is 10%, 9%, 8%, 7%, 6%, 5%, 4%, 3%, 2%, 1%, 0.5%, or 0.1%); a content of the positive electrode binder may range from 0.1% to 10% (for example, is 10%, 9%, 8%, 7%, 6%, 5%, 4%, 3%, 2%, %, 0.5%, or 0.1%).

In one embodiment, a charged cut-off voltage of the battery is greater than or equal to 4.48V.

In the present disclosure, the battery can further include a separator. The separator may be selected from conventional separators used in the art, including at least one selected from the group consisting of a polyethylene membrane and a polypropylene membrane.

In the present disclosure, the battery can further include an outer film casing. The outer film casing may include an aluminum-plastic film. A thickness of the outer film casing can range from 50 µm to 150 µm, for example, is 50 µm, 60 µm, 70 µm, 80 µm, 90 µm, 100 µm, 110 µm, 120 µm, 130 µm, 140 µm, or 150 µm.

In one embodiment, the thickness of the outer film casing ranges from 85 µm to 115 µm.

The inventors of the present disclosure have discovered that when the thickness of the outer film casing falls within a specific range, it can further mitigate the problem of damage and corner cracking of the outer film casing in the later stages of battery cycling. Furthermore, the outer film casing within this thickness range exhibits improved corrosion resistance to the electrolyte solution, which helps reduce side reactions, minimize electrolyte solution corrosion, decrease gas generation, and enhance safety performance.

In the present disclosure, the battery can include the outer film casing and a cell. The cell is accommodated in the outer film casing and includes the positive electrode plate, the separator, and the negative electrode plate. The positive electrode plate, the separator, and the negative electrode plate can be sequentially stacked in an order of the positive electrode plate, the separator, the negative electrode plate, and the separator, or may be wound to form a flat region and a bending region. The electrolyte solution is injected into the cell to form the battery.

In one embodiment, the battery is a pouch battery.

In the present disclosure, the battery can be a stacked pouch battery or a wound pouch battery. When the battery is a wound pouch battery, the improvement in mitigating corner cracking of the outer film casing is more pronounced.

In one embodiment, the battery is a lithium-ion battery.

In one embodiment, the battery is a lithium-ion secondary battery.

Through regulation of the relationship between: the silicon content in the negative electrode active material layer, the dimensions of the recesses, and the content of 1,3-propene sultone in the electrolyte solution, the present disclosure achieves significant improvement in mitigating outer film casing cracking during later battery cycles while maintaining high energy density. This enhancement improves the sealing performance of the battery, prevents moisture ingress, and enhances cycle stability, low-temperature discharge performance, and storage performance under high-temperature and high-humidity conditions of the battery.

The following describes the present disclosure in detail by using embodiments. The embodiments described in the present disclosure are merely some, but not all of the embodiments of the present disclosure. All other embodiments obtained by a person of ordinary skill in the art based on the embodiments of the present disclosure without creative efforts fall within the protection scope of the present disclosure.

In the following examples, unless otherwise specified, all materials used were commercially available analytical-grade reagents.

The following examples are provided to illustrate the battery of the present disclosure.

Example 1

The battery was prepared by the following method:
(1) Preparation of a Positive Electrode Plate A positive electrode active material (lithium cobalt oxide, $LiCo_{0.977}Al_{0.015}Mg_{0.005}Mn_{0.003}O_2$), a positive electrode binder (PVDF), and a positive electrode conductive agent (acetylene black) were mixed in a mass ratio of 97.2:1.3:1.5; N-methylpyrrolidone (NMP) was added, stirring was performed under action of a vacuum mixer until a mixed system became a positive electrode slurry with uniform fluidity; the positive electrode slurry was evenly applied on an aluminum foil with a thickness of 12 µm; and the coated aluminum foil was dried, followed by roll-pressing and cutting, to obtain the positive electrode plate.

(2) Preparation of a Negative Electrode Plate

A negative electrode active material (a combination of silicon-carbon and artificial graphite in a mass ratio of 1:9), a negative electrode conductive agent (a combination of single-walled carbon nanotube (SWCNT) and conductive carbon black (SP) in a mass ratio of 0.1:1), and a negative electrode binder (a combination of sodium carboxymethyl cellulose (CMC-Na) and styrene-butadiene rubber (SBR) in a mass ratio of 1:2) were mixed at a mass ratio of 95.9:1.1:3; a wet process was used to prepare a negative electrode slurry; the negative electrode slurry was evenly applied on two surfaces of a copper foil with a thickness of 6 µm; the coated copper foil was dried, roll-pressed, die-cut, and cold-pressed; subsequently, grooves were etched onto the surface of the negative electrode active material layer using laser processing technology; followed by the copper foil was slit, cut, and tab-welded to obtain the negative electrode plate. Where the values of parameters A, B, C, and D are listed in Table 1.

(3) Preparation of an Electrolyte Solution

In an argon-filled glove box (moisture<10 ppm, oxygen<1 ppm), EC, PC, PP, and EP were evenly mixed at a mass ratio of 1:1:2:1; $LiPF_6$, fluoroethylene carbonate, and 1,3,6-hexanetricarbonitrile that respectively accounted for 15%, 10%, and 2% of the total mass of the electrolyte solution were slowly added; then, PST and PS were added (addition amounts of PST and PS are listed in Table 1), and the mixture was stirred to obtain the electrolyte solution.

(4) Preparation of a Battery

The positive electrode plate prepared in step (1), a separator (a 5 m-thick polyethylene-based film coated on both sides with a 1 m-thick composite layer containing titanium oxide and poly(vinylidene fluoride-co-hexafluoropropylene), and the negative electrode plate prepared in step (2) were wound to form a bare cell; the bare cell was placed in an aluminum-plastic film (thickness: 105 m), and the electrolyte solution prepared in step (3) was injected into the dried bare cell, followed by processed such as vacuum packaging, standing, formation, shaping, and sorting, to obtain the battery.

Example 2

For this example, reference is made to Example 1. Differences are as follows. The dimensions of the grooves were altered, and the contents of PST and PS in the electrolyte solution were adjusted, as specifically shown in Table 1. The thickness of the aluminum-plastic film was changed from 105 μm to 113 μm, and the positive electrode active material $LiCo_{0.977}Al_{0.015}Mg_{0.005}Mn_{0.003}O_2$ was replaced with an equivalent mass of $LiCo_{0.96}Al_{0.015}Mg_{0.015}Mn_{0.01}O_2$.

Example 3

For this example, reference is made to Example 1. Differences are as follows. The dimensions of the grooves were altered, and the contents of PST and PS in the electrolyte solution were adjusted, as specifically shown in Table 1. The thickness of the aluminum-plastic film was changed from 105 μm to 95 μm, and the positive electrode active material $LiCo_{0.977}Al_{0.015}Mg_{0.005}Mn_{0.003}O_2$ was replaced with an equivalent mass of $LiCo_{0.977}Al_{0.015}Mg_{0.005}Mn_{0.003}O_2$.

Example 4

For this example, reference is made to Example 1. Differences are as follows. The dimensions of the grooves were altered, and the contents of PST and PS in the electrolyte solution were adjusted, as specifically shown in Table 1. The thickness of the aluminum-plastic film was changed from 105 μm to 88 μm, and the positive electrode active material $LiCo_{0.977}Al_{0.015}Mg_{0.005}Mn_{0.003}O_2$ was replaced with an equivalent mass of $LiCo_{0.95}Al_{0.02}Mg_{0.015}Mn_{0.015}O_2$.

Example 5 Group

The examples in this group were used to verify the influence brought about by the change of $C/(A \times E \times B \times D)$.

For this example group, reference is made to Example 1. Differences lie in that the dimensions of the grooves and the contents of PST and PS in the electrolyte solution were changed, as specifically shown in Table 1.

Example 6 Group

The examples in this group were used to verify the influence brought about by the change of A.

For this example group, reference is made to Example 1. A difference lies in that A was changed by adjusting the mass ratio of silicon-carbon to artificial graphite, as specifically shown in Table 1.

Example 7 Group

The examples in this group were used to verify the influence brought about by the changes of B and C.

For this example group, reference is made to Example 1. Differences lie in that B and C were changed, as specifically shown in Table 1.

Example 8 Group

The examples in this group were used to verify the influence brought about by the change of D.

For this example group, reference is made to Example 1. A difference lies in that D was changed, as specifically shown in Table 1.

Example 9 Group

The examples in this group were used to verify the influence brought about by the change of E.

For this example group, reference is made to Example 1. A difference lies in that E was changed, as specifically shown in Table 1.

Example 10 Group

The examples in this group were used to verify the influence brought about by the change of F or E/F.

For this example group, reference is made to Example 1. Differences lie in that E and/or F was changed, as specifically shown in Table 1.

Example 11 Group

The examples in this group were used to verify the influence of not adding a nitrile compound or a carbonate compound in the electrolyte solution.

For this example group, reference is made to Example 1. A difference lies in that the composition of the electrolyte solution was changed. Details are as follows.

In Example 11a, fluoroethylene carbonate was not added to the electrolyte solution.

In Example 11b, 1,3,6-hexanetricarbonitrile was not added to the electrolyte solution.

Example 12

For this example, reference is made to Example 1. A difference lies in that the negative electrode active material was replaced with the same mass of a combination of SiO and artificial graphite, in which the mass ratio of SiO to artificial graphite was 1:11.7.

Example 13

For this example, reference is made to Example 1. A difference lies in that in step (4), the positive electrode plate, the separator, and the negative electrode plate were sequentially stacked in the order of the positive electrode plate, the separator, the negative electrode plate, and the separator to obtain the bare cell.

Comparative Example 1

For this comparative example, reference is made to Example 1. Differences lie in that the dimensions of the grooves and the contents of PST and PS in the electrolyte solution were changed, as specifically shown in Table 1.

Comparative Example 2

For this comparative example, reference is made to Example 1. A difference lies in that there were no grooves on the surface of the negative electrode plate.

Comparative Example 3

For this comparative example, reference is made to Example 1. A difference lies in that PST was not added to the electrolyte solution.

Comparative Example 4

For this comparative example, reference is made to Example 13. Differences lie in that the dimensions of the grooves and the contents of PST and PS in the electrolyte solution were changed, as specifically shown in Table 1.

Note: The silicon-carbon used in the aforementioned examples and comparative examples was the following material: silicon particles embedded in porous carbon frameworks.

vations were made regarding whether the aluminum-plastic film damage occurred on the batteries bodies, and the elongation rate of the negative electrode plate was measured. Results were recorded in Table 2, where capacity retention rate (%)=($Q_1$/Q)×100%.

(2) High-Temperature and High-Humidity Storage Test at 60° C. For 35 Days

The batteries prepared in the Examples and Comparative Examples were discharged at 0.5 C, left standing for 5 minutes, and then charged at 0.7 C. This cycle was repeated twice, the second discharge capacity was recorded as an initial capacity $Q_2$. Fully charged batteries (a thickness of $T_0$) were left open-circuit at a condition of (60±2°) C and 90%-95% relative humidity for 35 days, the batteries were left open-circuited for 2 hours at room temperature, thicknesses of the stored batteries were measured after cooling

TABLE 1

| | A(%) | B(μm) | C(μm) | D(mm) | E(%) | C/(A × E × B × D) | F(%) | E/F |
|---|---|---|---|---|---|---|---|---|
| Example 1 | 5 | 10 | 80 | 0.8 | 0.2 | 10 | 4 | 0.05 |
| Example 2 | 5 | 15 | 100 | 1.2 | 1 | 1.11 | 3 | 0.33 |
| Example 3 | 5 | 20 | 120 | 1.5 | 2 | 0.4 | 2 | 1 |
| Example 4 | 5 | 30 | 150 | 2 | 3 | 0.17 | 1 | 3 |
| Example 5a | * | 20 | 80 | 2 | 3 | 0.13 | 1 | 3 |
| Example 5b | * | 10 | 150 | 0.8 | 0.2 | 18.75 | 4 | 0.05 |
| Example 6a | 3 | * | * | * | * | 16.67 | * | * |
| Example 6b | 10 | * | * | * | * | 5 | * | * |
| Example 6c | 15 | * | * | * | * | 3.33 | * | * |
| Example 6d | 1.2 | * | * | * | * | 41.67 | * | * |
| Example 6e | 20 | * | * | * | * | 2.5 | * | * |
| Example 6f | 0.8 | * | * | * | * | 62.5 | * | * |
| Example 6g | 25 | * | * | * | * | 2 | * | * |
| Example 6h | 0.5 | * | * | * | * | 100 | * | * |
| Example 6i | 28 | * | * | * | * | 1.79 | * | * |
| Example 7a | * | 5 | 200 | * | * | 50 | * | * |
| Example 7b | * | 50 | 40 | * | * | 1 | * | * |
| Example 8a | * | * | * | 0.5 | * | 16 | * | * |
| Example 8b | * | * | * | 5 | * | 1.6 | * | * |
| Example 9a | * | * | * | * | 0.1 | 20 | 2 | * |
| Example 9b | * | * | * | * | 5 | 0.4 | * | 1.25 |
| Example 10a | * | * | * | * | * | * | 0.5 | 0.4 |
| Example 10b | * | * | * | * | * | * | 6 | 0.03 |
| Example 10c | * | * | * | * | 3 | 0.67 | 0.5 | 6 |
| Example 10d | * | * | * | * | * | * | 0 | / |
| Example 11a | * | * | * | * | * | * | * | * |
| Example 11b | * | * | * | * | * | * | * | * |
| Example 12 | * | * | * | * | * | * | * | * |
| Example 13 | * | * | * | * | * | * | * | * |
| Comparative Example 1 | * | 5 | 200 | 0.5 | 0.1 | 160 | 2 | 0.05 |
| Comparative Example 2 | * | / | / | / | * | / | * | * |
| Comparative Example 3 | * | * | * | * | 0 | / | * | 0 |
| Comparative Example 4 | * | 5 | 200 | 0.5 | 0.1 | 160 | 2 | 0.05 |

Note:
The "*" in Table 1 indicates that the corresponding parameter value is the same as that in Example 1; the "/" indicates that it does not exist.

Test Example (1) 25° C. Cycle Test

The batteries prepared in the Examples and Comparative Examples were placed in an environment of (25±2°) C for 2 hours to 3 hours. When the bodies of the batteries reached (25±2°) C, the batteries were charged to an upper limit voltage at a constant current of 1.5 C, where a cut-off current was 0.05 C. The batteries were left aside for 5 minutes after being fully charged, and then discharged at a constant current of 0.7 C to a cut-off voltage of 3.0V. The highest discharge capacity in the first three cycles was recorded as an initial capacity Q. After completing 1000 cycles, the last discharge capacity $Q_1$ of the batteries was recorded. Obserrecorded as T. The batteries were discharged to 3.0V at a constant current of 0.5 C, and a remaining capacity was recorded. Then the batteries were charged at 0.7 C, left aside for 5 minutes, and then discharged at 0.5 C. This cycle was repeated three times. The highest capacity in the three cycles was recorded as the recovered capacity $Q_3$. Capacity retention rates of the batteries after high-temperature and high-humidity storage were calculated and whether the batteries bodies produced gas, and the results were recorded in Table 2. Among them, a capacity retention rate (%)=$Q_3$/$Q_2$×100%; a thickness change rate (%)=(T−$T_0$)/$T_0$×100%.

When the thickness change rate is less than 10%, the battery status is marked as "No gas generation"; when the thickness change rate falls within the range of 10% to 15% (including both endpoints), the battery status is marked as "Gas generation"; and when the thickness change rate is larger than 15%, the battery status is marked as "Severe gas generation".

(3) Low-Temperature Discharge Test at −10° C.

The batteries prepared in the Examples and Comparative Examples were subjected to 10 charge-discharge cycles at 0.7 C rate under room temperature. Subsequently, the batteries were charged to full capacity at 0.7 C rate, with the charged capacity recorded as $Q_4$. The fully charged batteries were then left aside at −10° C. for 4 hours, followed by discharge to 3V at 0.4 C rate. The discharged capacity was recorded as $Q_5$. The low-temperature discharge capacity retention rate was calculated using the following formula and the results were recorded in Table 2. Capacity retention rate $(r)=(Q_5/Q_4)\times 1000$.

Note: The upper voltage limit for all above test example was 4.5V.

TABLE 2

|  | 25° C. Cycle Test | | High-temperature and high-humidity storage test at 60° C. for 35 Days | | Capacity | |
| --- | --- | --- | --- | --- | --- | --- |
|  | Capacity Retention Rate (%) | whether aluminum-plastic film damage occurred | Capacity Retention Rate (%) | whether the battery produced gas | retention rate at low-temperature discharge (%) | elongation rate(%) |
| Example 1 | 84.8 | No damage | 64.9 | No gas generation | 72.5 | 2.6 |
| Example 2 | 82.6 | No damage | 62.7 | No gas generation | 71.4 | 2.8 |
| Example 3 | 81.8 | No damage | 61.9 | No gas generation | 70.8 | 2.7 |
| Example 4 | 81.4 | No damage | 61.1 | No gas generation | 70.2 | 2.9 |
| Example 5a | 71.4 | No damage | 51.1 | No gas generation | 61.8 | 3.2 |
| Example 5b | 74.2 | No damage | 54.4 | No gas generation | 64.5 | 3.5 |
| Example 6a | 85.1 | No damage | 65.5 | No gas generation | 73 | 2.5 |
| Example 6b | 82.2 | No damage | 62.2 | No gas generation | 71.5 | 2.7 |
| Example 6c | 79 | No damage | 59.1 | No gas generation | 69.1 | 3 |
| Example 6d | 85.3 | No damage | 65.7 | No gas generation | 73.3 | 2.5 |
| Example 6e | 76.4 | No damage | 55.8 | No gas generation | 65.8 | 3.3 |
| Example 6f | 85.4 | No damage | 65.3 | No gas generation | 73.1 | 2.6 |
| Example 6g | 74.8 | No damage | 55.2 | No gas generation | 64.3 | 3.5 |
| Example 6h | 84.9 | No damage | 65.3 | No gas generation | 73.1 | 2.7 |
| Example 6i | 71.4 | No damage | 51.5 | No gas generation | 61.3 | 3.9 |
| Example 7a | 72.8 | No damage | 52.2 | No gas generation | 62.3 | 3.4 |
| Example 7b | 73.8 | No damage | 53.3 | No gas generation | 63.7 | 3.8 |
| Example 8a | 73.6 | No damage | 55.9 | No gas generation | 65.1 | 3.2 |
| Example 8b | 71.6 | No damage | 50.7 | No gas generation | 60.3 | 3.8 |
| Example 9a | 74.1 | No damage | 53.4 | No gas generation | 63.1 | 3.3 |
| Example 9b | 71.5 | No damage | 51.6 | No gas generation | 61.9 | 3.5 |
| Example 10a | 76.3 | No damage | 57.2 | No gas generation | 66.1 | 3 |
| Example 10b | 75.1 | No damage | 55.8 | No gas generation | 64.5 | 3.3 |
| Example 10c | 74.6 | No damage | 54.33 | No gas generation | 63.1 | 3.4 |
| Example 10d | 70.1 | No damage | 50.13 | No gas generation | 60.2 | 3.9 |
| Example 11a | 68.3 | No damage | 49.8 | No gas generation | 59.3 | 3.9 |
| Example 11b | 66.5 | No damage | 46.2 | No gas generation | 57.3 | 3.9 |
| Example 12 | 82.1 | No damage | 62.6 | No gas generation | 71.3 | 2.9 |

TABLE 2-continued

|  | 25° C. Cycle Test | | High-temperature and high-humidity storage test at 60° C. for 35 Days | | Capacity | |
|---|---|---|---|---|---|---|
|  | Capacity Retention Rate (%) | whether aluminum-plastic film damage occurred | Capacity Retention Rate (%) | whether the battery produced gas | retention rate at low-temperature discharge (%) | elongation rate(%) |
| Example 13 | 85.6 | No damage | 65.3 | No gas generation | 74.8 | 2 |
| Comparative Example 1 | 60.3 | Damage | 40.8 | Gas generation | 50.4 | 4.9 |
| Comparative Example 2 | 38.8 | Damage | 38.3 | Severe gas generation | 26.9 | 6.9 |
| Comparative Example 3 | 40.8 | Damage | 20.7 | Severe gas generation | 30.6 | 6.3 |
| Comparative Example 4 | 63.7 | Damage | 43.3 | Gas generation | 53.1 | 4.2 |

It can be seen from Table 2 that, compared with Comparative Example 1 and Comparative Example 4, when C/(A×E×B×D) was within a specific range, the battery of the present disclosure could significantly mitigate the problem of damage and corner cracking of the outer film in the later stages of battery cycling. Compared with Comparative Example 2, the battery of the present disclosure had recesses on the surface of the negative electrode active material layer, which significantly improved the cycling performance and mitigated the problem of damage and corner cracking of the outer film in the later stages of battery cycling. Compared with Comparative Example 3, the electrolyte solution of the battery of the present disclosure included PST, which also significantly enhanced the cycling performance and mitigated the problem of damage and corner cracking of the outer film in the later stages of battery cycling.

The foregoing describes in detail a preferred implementation of the present disclosure. However, the present disclosure is not limited thereto. Within the scope of the technical concept of the present disclosure, various simple variations may be implemented to the technical solutions of the present disclosure, including combinations of technical features in any other suitable manner. These simple variations and combinations shall also be considered as the disclosed of the present disclosure and shall fall within the protection scope of the present disclosure.

What is claimed is:

1. A battery, comprising a negative electrode plate and an electrolyte solution; wherein
the negative electrode plate comprises a negative electrode current collector and a negative electrode active material layer disposed on at least one surface of the negative electrode current collector; the negative electrode active material layer comprises a negative electrode active material, which comprises a silicon-based material; and based on a total weight of the negative electrode active material layer, a content of silicon is A, in a unit of %;
a surface of the negative electrode active material layer has recesses with a depth of B, in a unit of μm; a width of C, in a unit of μm; and a spacing of D, in a unit of mm;
the electrolyte solution comprises 1,3-propene sultone, and a mass percentage of 1,3-propene sultone in a total mass of the electrolyte solution is E, in a unit of %;
a relationship $0.05 \leq C/(A \times E \times B \times D) \leq 100$ is satisfied.

2. The battery according to claim 1, wherein $0.1 \leq C/(A \times E \times B \times D) \leq 45$.

3. The battery according to claim 2, wherein $0.15 \leq C/(A \times E \times B \times D) \leq 17$.

4. The battery according to claim 1, wherein B ranges from 5 μm to 50 μm; and/or
C ranges from 40 μm to 200 μm; and/or
D ranges from 0.5 mm to 5 mm.

5. The battery according to claim 4, wherein B ranges from 10 μm to 30 μm; and/or
C ranges from 80 μm to 150 μm; and/or
D ranges from 0.8 mm to 2 mm.

6. The battery according to claim 1, wherein A ranges from 0.8% to 25%; and/or
E ranges from 0.1% to 5%; and/or
the silicon-based material comprises at least one of nano-silicon, silicon alloy, silicon oxide, or silicon carbon.

7. The battery according to claim 6, wherein A ranges from 1.2% to 20%; and/or
E ranges from 0.2% to 3%; and/or
the silicon-based material comprises the silicon carbon.

8. The battery according to claim 7, wherein A ranges from 3% to 15%; and/or
the silicon carbon comprises the following material: silicon particles embedded in a porous carbon framework.

9. The battery according to claim 1, wherein the electrolyte solution further comprises 1,3-propane sultone.

10. The battery according to claim 9, wherein a mass percentage of 1,3-propane sultone in the total mass of the electrolyte solution is F, in a unit of %, and $0.5\% \leq F \leq 6\%$; and/or
$0.02 \leq E/F \leq 6$.

11. The battery according to claim 10, wherein $1\% \leq F \leq 4\%$; and/or
$0.05 \leq E/F \leq 3$.

12. The battery according to claim 1, wherein, when the battery undergoes 1000 cycles at 25° C., an elongation rate of the negative electrode plate ranges from 2% to 5%, and a cycling condition comprises: the battery was charged to an upper limit voltage at a constant current of 1.5 C, wherein a cut-off current was 0.05 C, the battery was left aside for 5 minutes after being fully charged, and then discharge to a cut-off voltage of 3.0 V at a constant current of 0.7 C, and the upper limit voltage is 4.5 V.

13. The battery according to claim 12, wherein, when the battery undergoes 1000 cycles at 25° C., the elongation rate of the negative electrode plate ranges from 2% to 4%.

14. The battery according to claim 1, wherein the electrolyte solution further comprises at least one of a nitrile compound, a sulfur-containing compound, or a carbonate compound.

15. The battery according to claim 14, wherein the nitrile compound comprises at least one of succinonitrile, glutaronitrile, adiponitrile, pimelonitrile, suberonitrile, glycerin trinitrile, ethoxy(pentafluoro)phosphazene, 1,2,3,4,5-penta(2-cyanoethoxy)pentane, tris(2-cyanoethyl) phosphate, or 1,3,6-hexanetricarbonitrile; and/or
the sulfur-containing compound comprises at least one of ethylene sulfate and ethylene sulfite; and/or
the carbonate compound comprises at least one of ethylene carbonate, fluoroethylene carbonate, or vinylethylene carbonate.

16. The battery according to claim 1, further comprising a positive electrode plate, wherein the positive electrode plate comprises a positive electrode current collector and a positive electrode active material layer disposed on at least one surface of the positive electrode current collector; the positive electrode active material layer comprises a positive electrode active material, the positive electrode active material comprises a material represented by a formula of $Li_aCO_bM^1_{c1}M^2_{c2}M^3_{c3}M^4_{c4}O_2$, wherein $0.9 \leq a \leq 1.05$, $0.8 \leq b \leq 1.2$, $0 \leq c1 \leq 0.1$, $0 \leq c2 \leq 0.1$, $0 \leq c3 \leq 0.1$, $0 \leq c4 \leq 0.1$, and $M^1$, $M^2$, $M^3$ and $M^4$ each independently comprise at least one of Al, Mg, Mn, Cr, Ti, Zr, Y, La, or B.

17. The battery according to claim 1, wherein a charged cut-off voltage of the battery is greater than or equal to 4.48 V; and/or
the battery is a lithium-ion secondary battery; and/or
the battery is a pouch battery; and/or
the battery is a stacked pouch battery; and/or
the battery is a wound pouch battery.

18. The battery according to claim 1, further comprising an outer film casing and a cell, wherein the cell is accommodated in the outer film casing; the cell comprises a positive electrode plate, a separator, and the negative electrode plate; and/or
the outer film casing comprises an aluminum-plastic film; and/or
a thickness of the outer film casing ranges from 50 μm to 150 μm.

19. The battery according to claim 18, wherein the thickness of the outer film casing ranges from 85 μm to 115 μm.

20. The battery according to claim 18, wherein the positive electrode plate, the separator, and the negative electrode plate are sequentially stacked in an order of the positive electrode plate, the separator, the negative electrode plate, and the separator; and/or
the positive electrode plate, the separator, and the negative electrode plate are wound to form a flat region and a bending region.

* * * * *